(12) United States Patent
Sharma et al.

(10) Patent No.: US 9,425,591 B2
(45) Date of Patent: Aug. 23, 2016

(54) ARC DEFLECTING AND VENTILATION ASSEMBLY FOR ELECTRICAL ENCLOSURES AND SYSTEMS FOR ARC DEFLECTING AND VENTILATION

(71) Applicant: SCHNEIDER ELECTRIC INDUSTRIES SAS, Rueil Malmaison (FR)

(72) Inventors: Gautam Sharma, Bangalore (IN); Nithiyiaprakash Jagadeeswaran, Bangalore (IN); Siva Chavali, Bangalore (IN)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 177 days.

(21) Appl. No.: 14/525,249

(22) Filed: Oct. 28, 2014

(65) Prior Publication Data
US 2015/0116911 A1    Apr. 30, 2015

(30) Foreign Application Priority Data
Oct. 31, 2013   (IN) .......................... 1241/KOL/2013

(51) Int. Cl.
*H05K 5/02*     (2006.01)
*H05K 7/20*     (2006.01)
*H02B 13/025*   (2006.01)
*H02B 1/56*     (2006.01)

(52) U.S. Cl.
CPC ............. *H02B 13/025* (2013.01); *H02B 1/565* (2013.01)

(58) Field of Classification Search
CPC ............ H05K 5/00; H05K 5/02; H05K 7/20; H05K 5/0217; H05K 7/20127; H05K 5/20581; H02B 1/00; H02B 13/025; H02B 7/00; H01H 33/53; H01H 9/342; H01H 1/56; H01H 1/565; H01H 9/34; H01H 33/08
USPC ......... 361/600, 601, 605, 608, 611, 614, 618, 361/622, 624, 634, 636, 641, 652, 656, 673, 361/676, 678; 218/34, 35, 149, 151, 218/154–158; 335/8–11, 85, 102, 120, 160, 335/132, 165–176, 201, 202; 200/50.1, 200/50.3, 50.17, 50.21, 50.23, 50.32, 200/306–308, 289, 400; 174/17 R, 17 VA, 174/50, 58, 68.1, 520; 454/184, 185, 186; 312/223.2
See application file for complete search history.

(56) References Cited

U.S. PATENT DOCUMENTS

| 5,710,402 | A  | * | 1/1998  | Karnbach | ............ | H02B 13/025 |
|           |    |   |         |          |              | 218/157 |
| 6,417,443 | B1 | * | 7/2002  | Smith    | .................... | H02B 1/565 |
|           |    |   |         |          |              | 174/17 VA |
| 6,827,643 | B2 | * | 12/2004 | Eiselt   | ...................... | H02B 1/56 |
|           |    |   |         |          |              | 174/17 VA |

(Continued)

FOREIGN PATENT DOCUMENTS

WO     2012118641 A1    9/2012

*Primary Examiner* — Michail V Datskovskiy
(74) *Attorney, Agent, or Firm* — Mark M. Friedman

(57) ABSTRACT

The present invention relates to an arc deflecting and ventilation assembly (100) comprising of a slotted unit (102), wire mesh arrangement (106) and an array of are plates (108). The slotted unit (102) is provided with a plurality of slots (104) and is fixedly mounted to the electrical enclosure (109) and is provided with an open face (110), a closed face (112) and a wall structure (114). The arc deflecting and ventilation assembly (100) provides ventilation to the electrical enclosure (109) during normal conditions and also in an event of arcing.

The present invention also provides systems (101) for arc deflecting and ventilation of hot gases generated within electrical enclosures (109).

22 Claims, 11 Drawing Sheets

(56) References Cited

U.S. PATENT DOCUMENTS

| | | | | |
|---|---|---|---|---|
| 6,960,736 B1* | 11/2005 | Bach | H01H 9/342 | 200/306 |
| 7,576,985 B2* | 8/2009 | Kingston | H02B 13/025 | 165/104.33 |
| 7,674,996 B2 | 3/2010 | Shea et al. | | |
| 7,778,013 B2* | 8/2010 | Bruski | H02B 1/56 | 361/605 |
| 8,189,325 B2* | 5/2012 | Kurogi | H02B 13/01 | 218/157 |
| 8,747,771 B2* | 6/2014 | Froderberg | A61L 2/07 | 134/105 |
| 8,791,361 B2* | 7/2014 | Gingrich | H02B 1/565 | 174/17 VA |
| 9,007,746 B2* | 4/2015 | Rajvanshi | H05K 7/20581 | 165/104.33 |
| 9,117,607 B2* | 8/2015 | Page, II | H01H 33/53 | |
| 9,271,421 B2* | 2/2016 | Pharne | H02B 13/025 | |
| 2005/0258141 A1 | 11/2005 | Meeks et al. | | |
| 2007/0097604 A1* | 5/2007 | Bruski | H02B 1/56 | 361/605 |
| 2011/0292575 A1* | 12/2011 | Franco | H02B 13/025 | 361/622 |
| 2012/0028559 A1* | 2/2012 | Kingston | H05K 5/0213 | 454/184 |
| 2014/0118887 A1* | 5/2014 | Deb et al. | H02B 13/025 | 361/622 |
| 2014/0133071 A1* | 5/2014 | Gingrich | H02B 1/565 | 361/678 |

* cited by examiner

ARC DEFLECTING AND VENTILATION ASSEMBLY FOR ELECTRICAL ENCLOSURES AND SYSTEMS FOR ARC DEFLECTING AND VENTILATION

FIELD OF INVENTION

This present invention relates to enclosures for electrical switching apparatus having ambient ventilation systems. A venting arrangement for an electrical enclosure that permits venting of heated gases generated within the enclosure in normal conditions and in case of an internal arc event it stops the hot particles, molten material and debris from harming the user.

BACKGROUND OF INVENTION

An electric arc or arc discharge is an electrical breakdown of a gas that produces an ongoing plasma discharge, resulting from a current through normally nonconductive media such as air. An arc discharge is characterized by a lower voltage than a glow discharge, and relies on thermionic emission of electrons from the electrodes supporting the arc.

Arc faults are particularly dangerous and potentially fatal to personnel. During an arc fault in an electrical equipment enormous energy is released from the electrical housing that houses the electrical equipment and this can cause serious injuries to personnel in close vicinity of the electrical housing, including severe burns, ruptured eardrums, collapsed lungs, damaged eyesight and in some cases death. Accident reports have revealed that electricians have been injured even at distances of 3 meters or more away from the arc point. Arc faults produce large shock waves that can blow personnel off their feet and there is also the risk of being exposed to flying debris together with a possibility of temperatures at the arc point reaching as high as 20,000° C. The intense heat generated during an arcing event can vaporize the copper present in the electrical equipments and wires and the copper vapor expands to 67,000 times the volume of solid copper. Metal is blasted and splattered from the arc point. The volume of hot ionized gas produced, increases proportionally with energy. It is thus crucial to remove the source of energy as soon as possible in order to eliminate the avalanche effect of an arc flash fault.

Arc flash is common phenomenon in electrical switchboards. When an internal arc happens in a switch board extreme pressure inside the panel is developed. This pressure exerts a significant force on the panel parts such as door, side panels, rear panels and roof tops often dislodging these parts and may result in an explosion. Many times working personnel become victims at workplace while operating on electrical equipments owing to this arc faults. Arc flash can cause traumatic injuries. The superheated ball of gas accompanying the flash can cause burns all over the human body and lungs. Death from these injuries is a real possibility.

Certain prior art documents discloses arc ventilation assemblies with an aim to address the above mentioned problems, including overheating and internal arcs generated in an electrical enclosure. United States patent publication 20050258141 discloses an enclosure with arc resistant features. The arc resistant feature as disclosed in US 20050258141 is provided with perforated areas and mesh openings that are aligned with the window enabling venting of hot gases generated within the electrical enclosure, but the invention disclosed in US 20050258141 is related only to pressure relief, through a flap, in case of internal arc event. It does not include any natural ventilation in normal conditions.

Similarly another prior art document, U.S. Pat. No. 7,674,996, discloses gassing insulators for arc chute assemblies being provided with wire mesh and a plurality of arc plates for reducing an arc. But the disadvantage associated with the invention disclosed in U.S. Pat. No. 7,674,996 is that the function of arc plates in this invention is to divide the arc and to increase the length of the arc. It does not provide any ventilation as such.

In addition another prior art WO/2012/118641 discloses an arc resistant transformer enclosure having arc channels. The arc resistant transformer enclosure disclosed in WO/2012/118641 has ventilation gratings, openings and a roof structure with ventilation openings and holes. But the limitation of the invention disclosed in WO/2012/118641 is that the enclosure is configured to block the path of the gases in the event of internal arc whereas the subject invention filters the molten and hot particles, and also releases the gases at lower temperature and pressure.

With a view therefore to avert or to overcome the problems associated with the conventional arc ventilation units and assemblies the inventors felt the need to develop a new arc deflecting and ventilating assembly that enables ventilation under normal conditions and even during an event of an arc flash. The invented arc deflecting and ventilation assembly has a slotted box with a plurality of slots, an array of arc plates placed in a predefined angle within the slotted box and the slots in the box are covered with wire mesh arrangements disposed in the inner periphery of the slotted box. The invented arc deflecting and ventilation assembly is configured to vent out hot gases generated within the electrical enclosure and also filters the molted particles generated during an arc. It is also provided with arc plates which deflect the hot gases and particles downwards thereby enabling a reduction in pressure of the gases. It also facilitates controlled release of the hot gases generated during an arcing event thus the person standing in front of the switchgear is protected from injury.

In addition, the invented arc deflecting and ventilation assembly helps in reducing the pressure of gases generated during internal arc by deflecting the generated hot gases and particles and at the same time releasing the pressure out of the electrical enclosure. The invented arc deflecting and ventilation assembly is configured to be attached to electrical enclosure(s) housing electrical equipment(s) therewithin. In normal conditions the invented arc deflecting and ventilation assembly provides a path for ventilation of heat generated by the electrical component(s). The invented arc deflecting and ventilation assembly is configured to block the molten metal and hot particles escaping from the electrical enclosure during an arcing event. Thereby, the invention also enhances the personnel safety to working personnel and protects them against an arc flash.

SUMMARY OF THE INVENTION

Accordingly, the present invention provides arc deflecting and ventilation assembly for electrical enclosure, housing at least an electrical equipment, said arc deflecting and ventilation assembly comprising:

a slotted unit fixedly mounted/attached to said electrical enclosure, said slotted unit having a closed face, an open face and a wall structure, said open face is placed adjacent to said electrical enclosure and said closed face is placed away from said electrical enclosure, upon said slotted unit being attached to said electrical enclosure, and said wall structure being provided with plurality of slots, in spaced apart manner, for venting hot gases generated within said electrical enclosure during an arcing event, as well as during normal operation of said electrical equipment, an array of arc plates disposed on the open face of said slotted unit in spaced apart manner and configured to divert hot gases generated within the said electrical enclosure and mesh filter arrangement disposed along the inner periphery of said slotted unit and being configured to filter particles generated within said electrical enclosure during an arc event, wherein said closed face is configured to divert said hot gases generated within said electrical enclosure towards said wall structure, and wherein the walls of said slotted unit are provided with retaining means by means of which each of said arc plates is disposed on said slotted unit at a predefined angle relative to a plane of said slotted unit.

According to a particular embodiment of the invention said closed face is in the form of a plate attached to said wall structure. Preferably, said mesh filter arrangement is a wire mesh arrangement.

According to yet another embodiment of the invention said wire mesh arrangement is permanently fastened to the said slotted unit.

According to a further embodiment of the invention said slots are provided along the walls of said slotted unit in a spaced apart manner.

According to a preferred embodiment of the invention, said arc plates are made of sheet metal.

According to a preferred embodiment of the invention, said arc plates are rectangular in shape and are arranged to subtend at an angle ranging from 30° to 75° relative to the plane of the open face of said slotted unit. Preferably, said arc plates are disposed parallel to each other and equidistant from their adjacent arc plate(s).

According to one of the embodiment of the invention, said retaining means are formed by providing angular grooves on the face of said wall structure.

According to a most preferred embodiment of the invention, said slotted unit is box shaped and said wall structure being formed of a pair of two mutually opposing panel members, wherein each of said panel members being configured to engage with its adjacent panel members on its either side and wherein each of said panel members being provided with flanges along its edges for retaining said wire mesh arrangements and said slots are provided on said panel members.

Preferably the slots provided on said panel members are rectangular in shape and are equidistant from its adjoining slot(s).

According to yet another embodiment of the invention, the arc plates are disposed on the open face of said slotted unit and span the length of the slots provided on said slotted unit.

According to still another embodiment of the invention said wire mesh arrangement is configured to filter particles of size 0.04".

According to another embodiment of the invention the percentage of opening in said wire mesh arrangement is in the range of 50% to 70%.

The present invention also provides a system for arc deflecting and ventilation of hot gases generated within an electrical enclosure, comprising:

a electrical enclosure, at least an electrical equipment housed within said electrical enclosure, and at least an arc deflecting and ventilation assembly as proposed in the present invention, said are deflecting and ventilation assembly being attached to said electrical enclosure, According to the a particular embodiment of the invented system, said system is provided with a forced ventilation assembly to assist said arc deflecting and ventilation assembly in venting said hot gases generated within said electrical enclosure; said forced ventilation assembly may comprise of a fan configured to divert said hot gases generated within said electrical enclosure towards said are deflecting and ventilation assembly.

The present invention also provides a system for arc deflecting and ventilation of hot gases generated within electrical enclosures, comprising:

an electrical enclosure, at least an electrical equipment housed within each of said electrical enclosure, and at least two arc deflecting and ventilation assemblies as proposed in the present invention, said arc deflecting and ventilation assemblies being fixedly disposed on the electrical enclosure, The present invention also provides a system for arc deflecting and ventilation of hot gases generated within electrical enclosures, comprising:

two electrical enclosures, at least an electrical equipment housed within each of said electrical enclosures, and at least two arc deflecting and ventilation assemblies as proposed in the present invention, said arc deflecting and ventilation assemblies fixedly disposed between said electrical enclosures.

BRIEF DESCRIPTION OF THE ACCOMPANYING DRAWINGS

For better understanding, various embodiments of the invention will now be described with reference to the accompanying drawings. It will, however, be appreciated that the embodiments exemplified in the drawings are merely illustrative and not limitative to the scope of the invention, because it is quite possible, indeed often desirable, to introduce a number of variations in the embodiments that have been shown in the drawings. In the accompanying drawings FIG. 1 is a perspective view of a particular embodiment of the invented arc deflecting and ventilation assembly.

Figure 9:
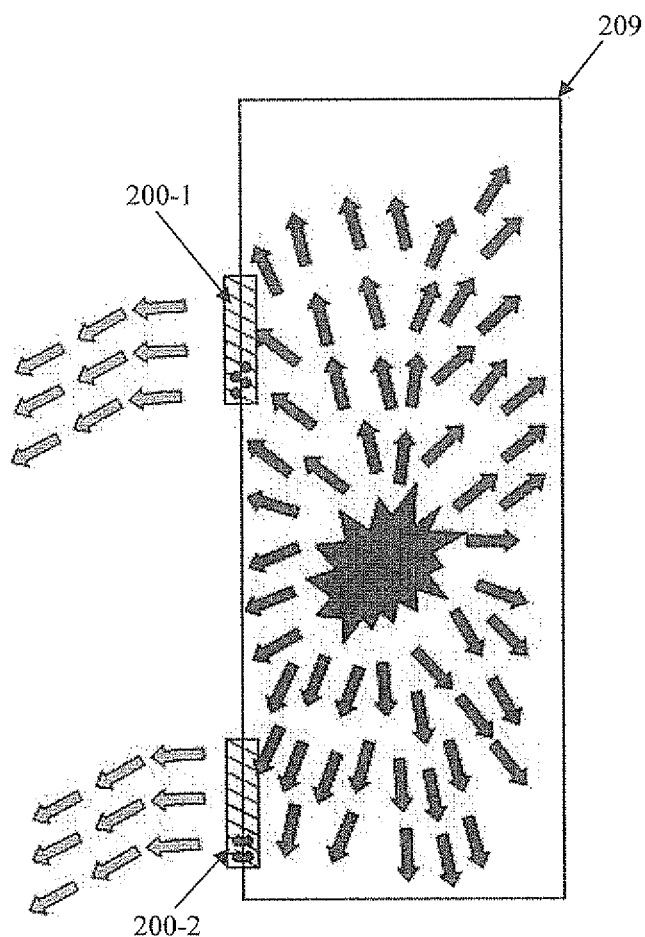

FIG. 9 schematically shows how molten material and hot gases are restricted from coming out in an internal arc event and how gases are released out at a lower temperature and pressure while achieving ventilation in normal conditions according to a particular embodiment of the invented arc deflecting and ventilation assembly.

FIG. 10(a) schematically shows how molten material and hot gases are restricted from coming out in an internal arc event and how protection of adjacent panel/enclosure is achieved while achieving ventilation in normal conditions according to another particular embodiment of the invented arc deflecting and ventilation assembly.

FIG. 10(b) schematically shows the path of the molten particles generated during an arc event and how the molten particles are blocked by the closed face of the slotted unit.

Figures 11, 12:
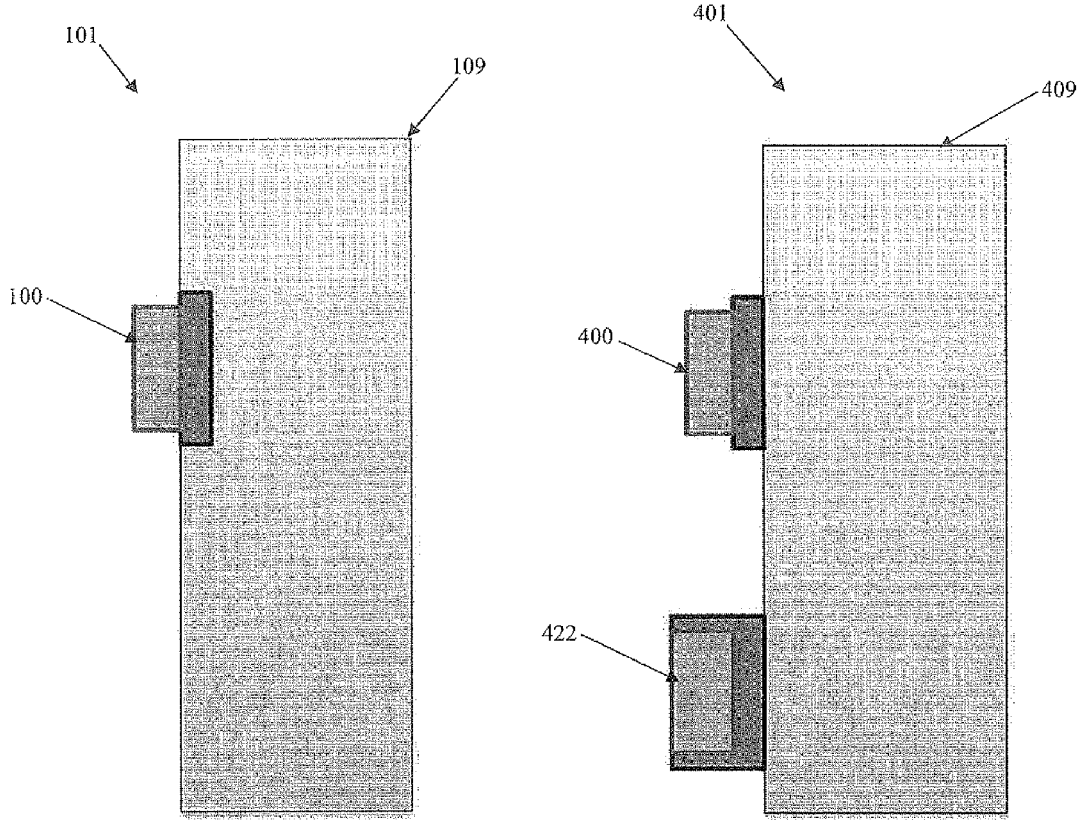

FIG. 11 schematically shows the electrical enclosure provided with the invented arc deflecting and ventilation assembly, according to a particular embodiment of the invention.

FIG. 12 schematically shows the electrical enclosure with the invented arc deflecting and ventilation assembly with a forced ventilation assembly, according to a further embodiment of the invention.

DETAILED DESCRIPTION OF THE DRAWINGS

Figure 1:
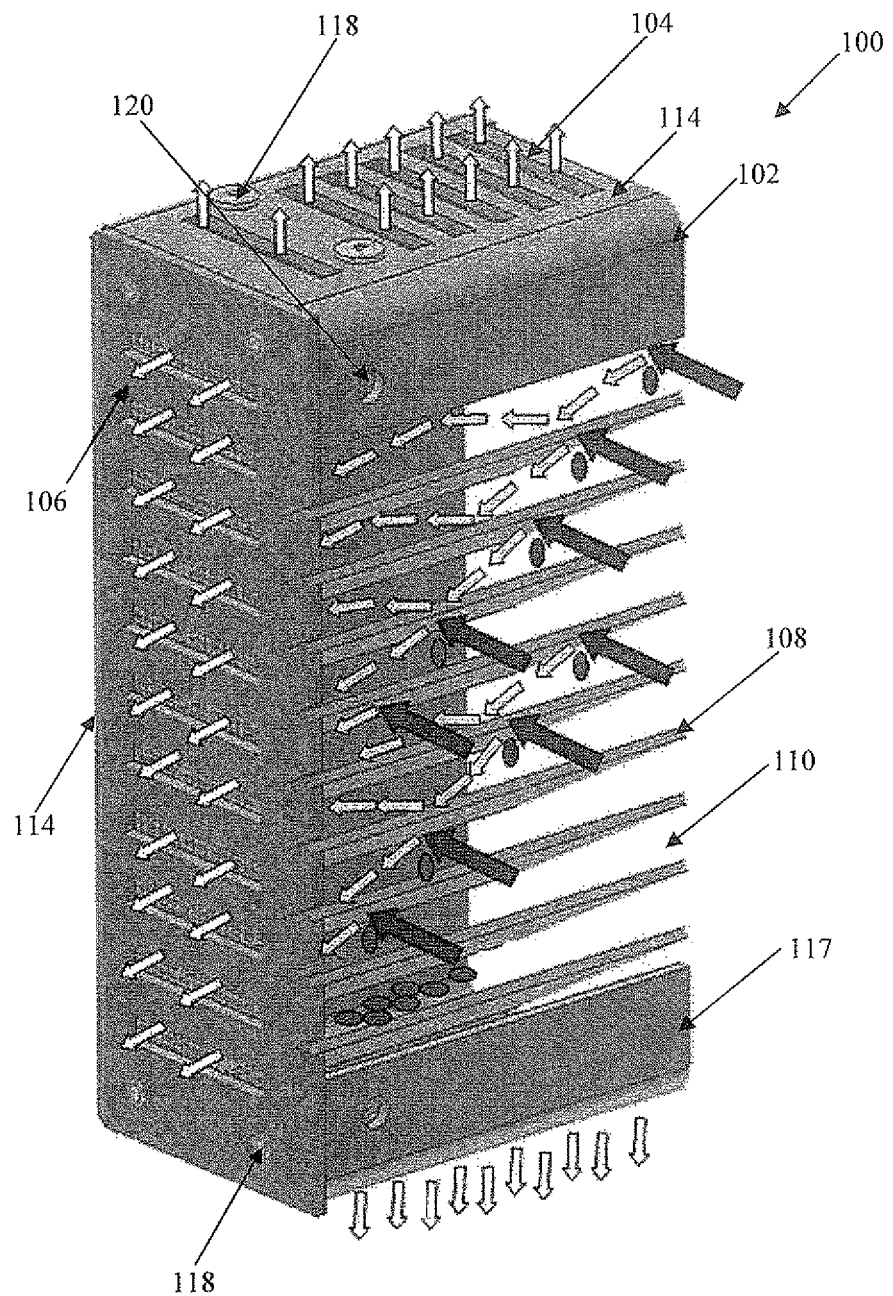
Figure 2:
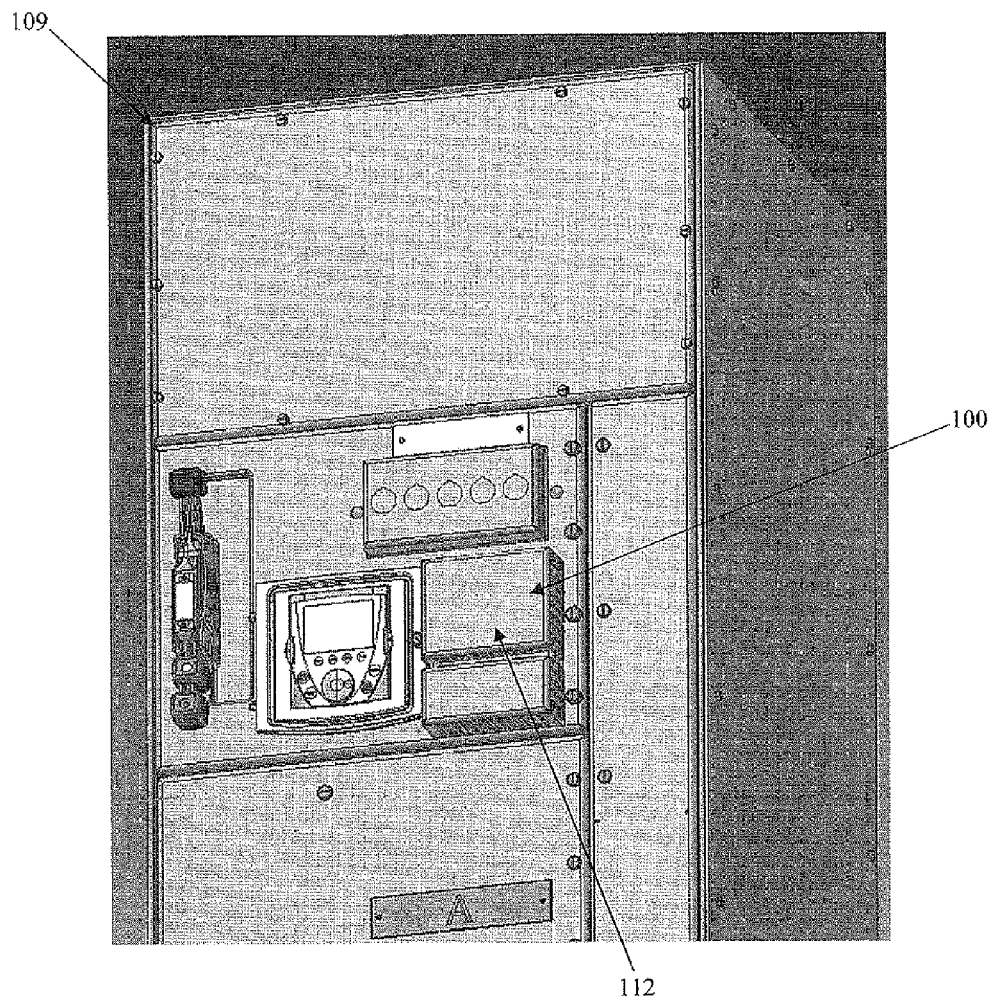
FIG. 2 shows the arc deflecting and ventilation assembly of FIG. 1 attached to an electrical enclosure.
Figure 3:
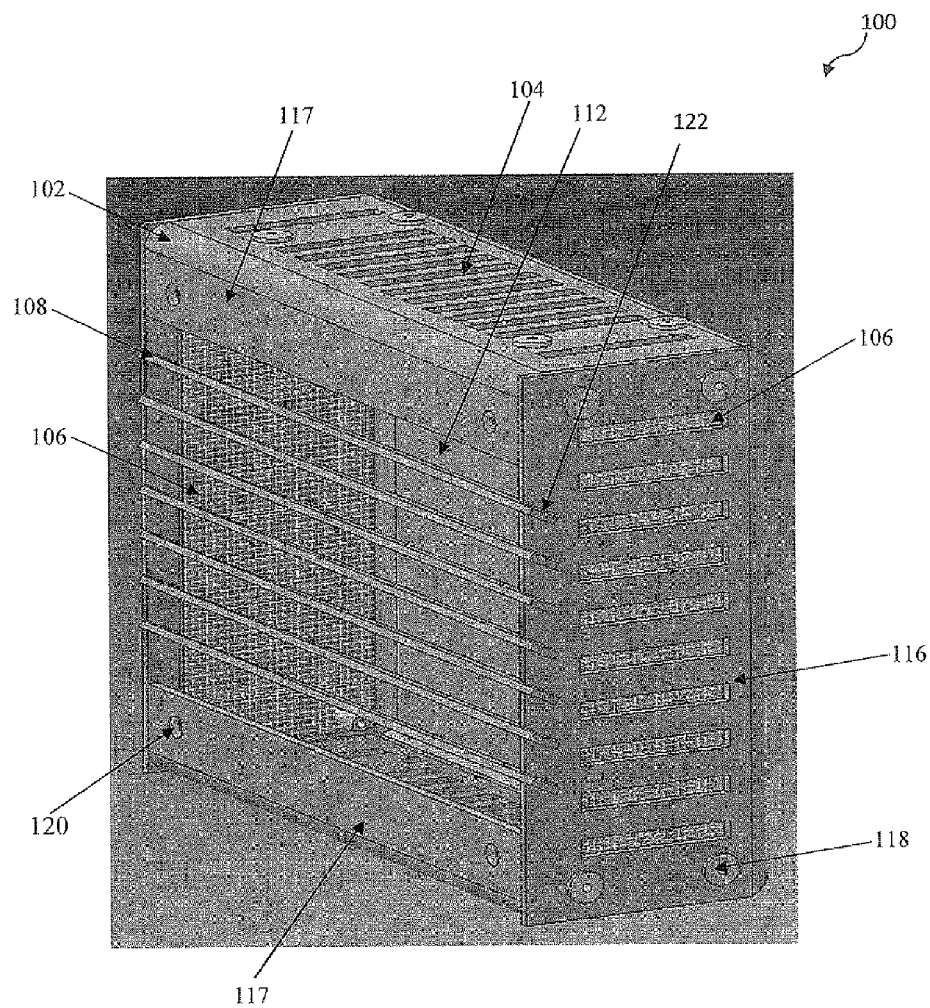
FIG. 3 shows another perspective view of the particular embodiment of the invented are deflecting and ventilation assembly.
Figure 5:
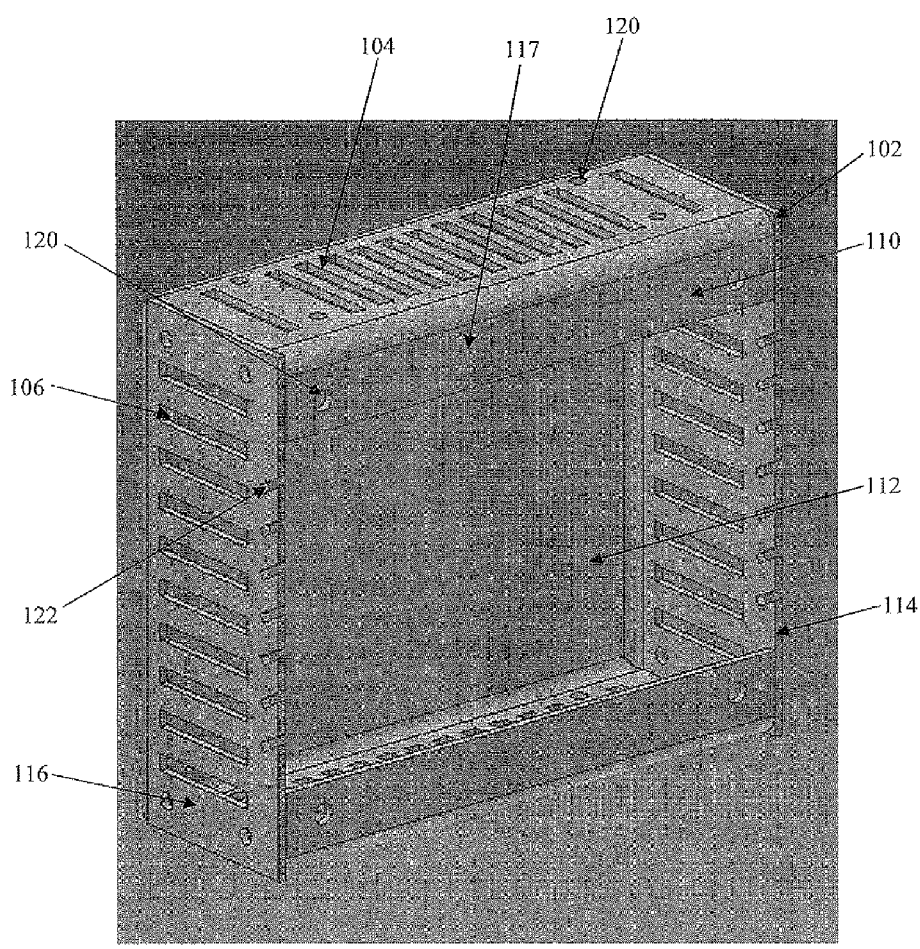
FIG. 5 is yet another perspective view of the particular embodiment of the invented arc deflecting and ventilation assembly showing the open face of slotted unit.

Referring to FIG. 1 and FIG. 3 of the accompanying drawings, the arc deflecting and ventilation assembly (100) according to a particular embodiment of the invention, comprises a slotted unit (102), a plurality of slots (104), wire mesh arrangement (106), and an array of arc plates (108). The slotted unit (102) is fixedly mounted to the electrical enclosure (109) (as shown in the FIG. 2). The slotted unit (102) has an open face (110), a closed face (112) and a wall structure (114). The slotted unit (102), according to the preferred embodiment of the invention, is box shaped and the wall structure (114) formed by four side engaging members (116). Each of said side engaging members (116) is being provided with flanges (117) along their edges (as shown in FIGS. 3 and 5) for retaining said wire mesh arrangement (106) in position. The side engaging members (116) are attached to each other by means of mechanical fasteners (118) to constitute the box shaped wall structure (114).

Referring to FIG. 2, the open face (110) of arc deflecting and ventilation assembly (100) is placed adjacent to the electrical enclosure (109) i.e. towards the direction facing the electrical enclosure (109), while the closed face (112) of arc deflecting and ventilation assembly (100) is placed away from the electrical enclosure (109) i.e. in the direction opposite to the electrical enclosure (109).

Figure 4:
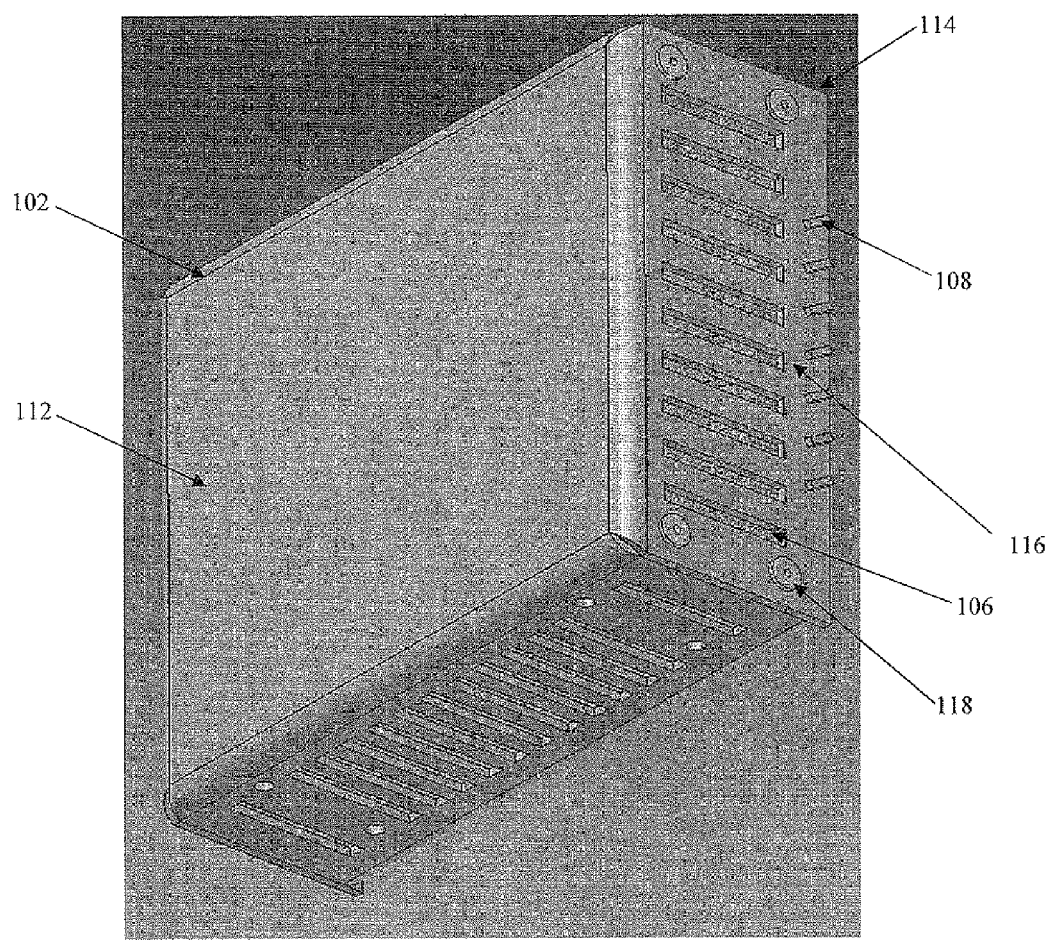
FIG. 4 is another perspective view of the particular embodiment of the invented arc deflecting and ventilation assembly showing the closed face of slotted unit.
Figure 6:
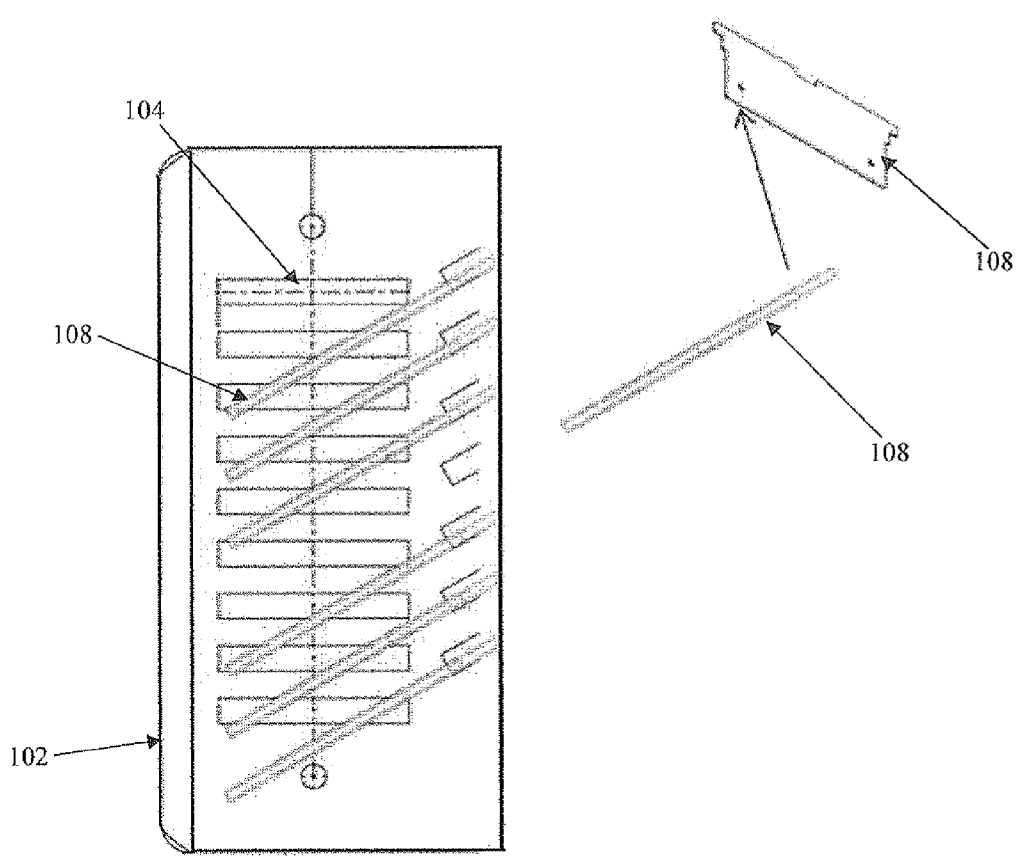
FIG. 6 illustrates the angular arrangement of the arc plates within the slotted unit according to the particular embodiment of the invented are deflecting and ventilation assembly.
Figure 8:
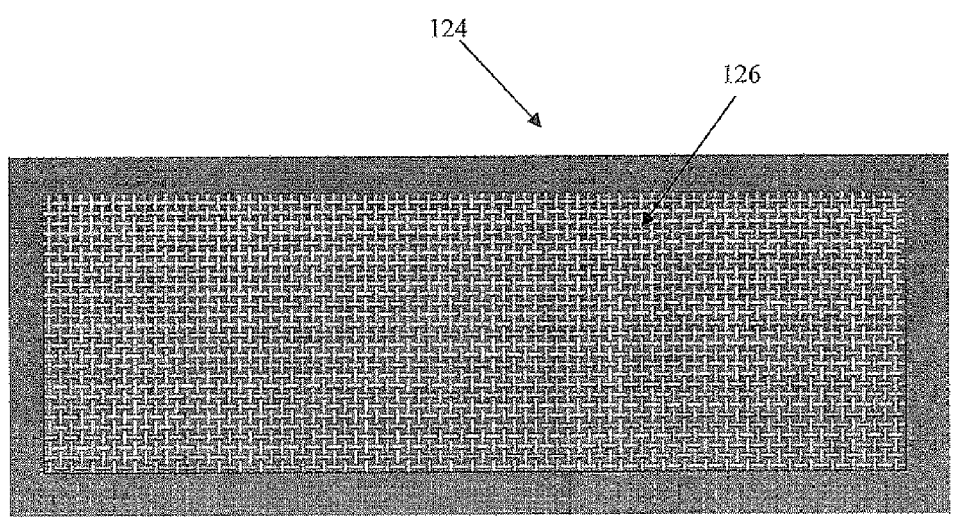
FIG. 8 shows the wire mesh arrangement used in the invented are deflecting and ventilation assembly.

Referring to FIGS. 2, 4 and 5 the slotted unit (102) is also provided with holes (120) for attaching the assembly (100) with the electrical enclosure (109). The walls of the slotted unit (102) are provided with a plurality of angular grooves (122). The angular grooves (122) help to dispose the arc plates (108) along the open face (110) of the slotted unit (102). The arc plates (108) are disposed parallel to each other. The angular grooves (122) on the sides of the slotted unit (102) can be of any profile like C shaped, L shaped etc. based on requirements. As seen in FIG. 6, the arc plates (108) are positioned angularly onto the slotted unit (102) at a predefined angle relative to the plane of the open face (110). Each of the arc plates (108) can subtend an angle ranging between 30° to 75° relative to a plane of the open face (110). The arc plates (108) are arranged in such a manner that it doesn't overlap the area of the slots (104) and to divert the gases generated within the electrical enclosure (109) in a perpendicular direction before the gas leaves the arc deflecting and ventilation assembly (100). The arc plates (108) deflect the pressurized gases and hot gases coming out of the electrical enclosure (109). The arc plates (108) reduce the velocity of particles and gases, generated within the electrical enclosure (109), by changing the direction of flow of the gases and particles and by making a complex long path for exit of the arc gases and particles. The wall structure (114) of the slotted unit (102) is provided with a plurality of slots (104) in a spaced apart manner. The slots (104) provided on the slotted unit (102) allow ventilation of gases generated within the electrical enclosure (109) in normal condition and also let the gases out generated within the electrical enclosure (109) during an arc event. The open percentage of slots (104) can be 40-50% of overall surface area. These slots (104) are placed only at the sides of the slotted unit (102) such that it will divert the gases to the sides rather than directly letting it over the operator standing in front of the electrical enclosure (109). The inner periphery of the slotted unit (102) is provided with wire mesh arrangement (106) to filter the molten particles generated within the electrical enclosure (109). The wire mesh arrangement (106) are pasted or welded over the slotted unit (102) so that the wire mesh arrangement (106) doesn't come off during an arc event. The wire mesh arrangement (106) is positioned over the slots (104) in such a way to prevent any molten particle from escaping the are deflecting and ventilation assembly (100) through the wire mesh arrangement (106). This ensures that all the flying particles during an arc event are stopped within the arc deflecting and ventilation assembly (100), thus safeguarding the operator/person standing in front of the electrical enclosure (109). The wire mesh arrangement (106) is always placed inside the slotted unit (102) so as to prevent the wire mesh arrangement (106) from being damaged. According to a preferred embodiment of the invention the percentage opening of the wire mesh arrangement (106) is 50% to 70% to ensure good ventilation to the electrical enclosure (109) during normal operation. The wire mesh arrangement (106) is configured to filter even particles of size 0.04", thus particles as small as 0.04"cannot escape from the assembly (100). The wire mesh arrangement (106) is configured to withstand high temperature and has sufficient strength to withstand the impact of the high velocity particles during an arc event. The material used in fabricating the wire mesh arrangement (106) and the gauge of the wire mesh arrangement (106) material are the determining factors so far as the strength of the wire mesh arrangement (106) is concerned. Thus the material to be used for the wire mesh arrangement (106) and the gauge of the wire mesh arrangement (106) are chosen based on desired specification. Referring to FIG. 8, the wire mesh arrangement (106) consists of semi-permeable barrier made of connected strands of metal. The wire mesh arrangement (106) is used to obstruct the hot particles coming out from the electrical enclosure (109) during an arc event. The wire mesh arrangement (106) is attached to all sides of the slotted unit (102). The wire mesh arrangement (106) comprises of rectangular shaped mesh units (124). Each of the mesh unit (124) are configured to commensurate with the dimension of said side engaging members (16) and are retained by the flanges (117) of said side engaging members (116). The mesh portion (126) of the mesh unit (124) cover the slots (104) provided on the slotted unit (102). Each of the said mesh unit (124) is fixed to its respective slotted unit (102) by means of mechanical fasteners (118) as seen in FIG. 1.

FIG. 1 also shows the mechanism of heat dissipation from the slotted unit (102). The slotted unit (102) absorbs the heat generated in the electrical enclosure (109) (as shown in FIG. 2) and vents it outside. The are deflecting and ventilation assembly (100) enables conventional air circulation and vents out hot gases under normal condition and also in an event of arc flash or arcing. The closed face (112) (as shown in FIG. 2) of the slotted unit (102) helps in deflecting the hot gases generated within the electrical enclosure (109) downwards and upward directions protecting the person standing in front of the arc deflecting and ventilation assembly (100). In other words, the closed face (112) deflects the hot gases in directions substantially perpendicular to the initial direction of flow of the gases, as seen in FIG. 1.

Referring to FIGS. 2 and 11 the arc deflecting and ventilation assembly (100) is permanently disposed to the electrical enclosure (109). The electrical enclosure (109) houses at least an electrical equipment (not shown in FIGS. 2 and 11). The arc deflecting and ventilation assembly (100) fixed on the electrical enclosure (109) vents out hot gases generated within the electrical enclosure (109) during normal conditions and also in an event of an arc flash. The arc deflecting and ventilation assembly (100) is mounted on the electrical enclosure (109) is such a way that the closed face (112) faces the operator and the open face (110) of the said arc deflecting and ventilation assembly (100) faces in the direction opposite to that of the closed face (112). The closed face (112) of the arc deflecting and ventilation assembly (100) helps to deflect the hot gases generates within the electrical enclosure (109) towards the sides i.e. towards the side panel of the slotted unit (102) of the said arc deflecting and ventilation assembly (100) thereby protecting the operator from the hot gases and the arc flash generated.

FIGS. 4 and 5 of the accompanying drawings, show the front view and the rear view of the said slotted unit (102) respectively. The slotted unit (102) is box shaped and is formed out of sheet metal having slots (104) on the side engaging members (116). It has angular grooves (122) provided to accommodate the are plates (108). The open face (110) of slotted unit (102) is seen in FIG. 5, while the closed face (112) of the slotted unit (102) is seen in FIG. 4. The closed face (112) of the slotted unit (102) helps to deflect the hot gases formed in an electrical enclosure (109) through the sides of the slotted unit (102) thereby protecting the operator standing in front of the electrical enclosure (109). The said slots (104) on the wall structure (114) are rectangular in shape.

Figure 7:
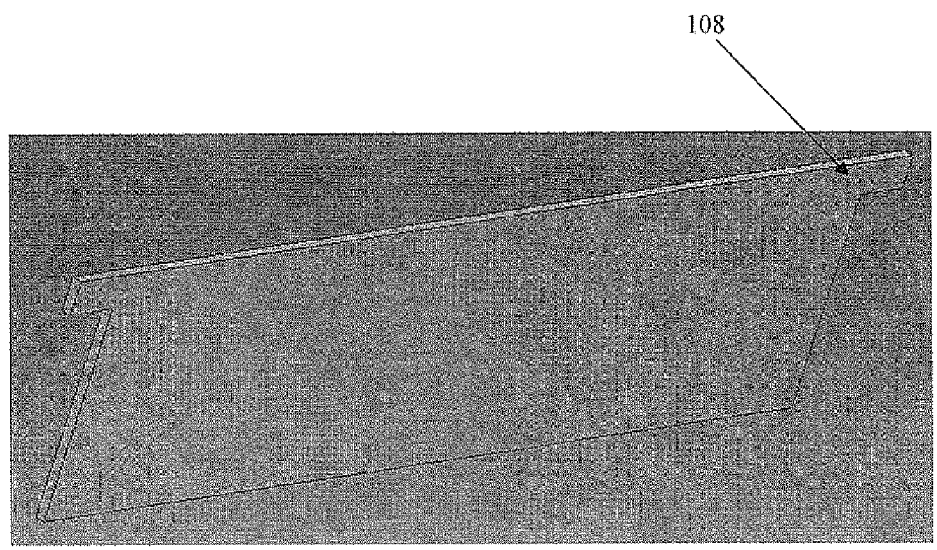
FIG. 7 illustrates the front view of the arc plate used in the invented are deflecting and ventilation assembly.

As seen in FIGS. 6 and 7, the arc plates (108) are rectangular sheet metal plates which are inserted into the slotted unit (102) in a predefined angle from the horizontal plane. The arc plates (108) are disposed on the slotted unit (102) in such a way that they span the length of the slots (104) provided on said slotted unit (102). These plates (108) deflect the pressurized gases and hot particles coming out of the vent openings.

FIG. 9 illustrates another embodiment of the invention. Here the invented system comprises of an electrical enclosure (209) housing at least one electrical equipment with two arc deflecting and ventilation assemblies (200-1 and 200-2) fixedly disposed to the electrical enclosure (209) to deflect and the vent out the hot gases generated within the said electrical enclosure (209). Here the two arc deflecting and ventilation assemblies (200-1 and 200-2) are arranged in such a way that one of the two arc deflecting and ventilation assembly (200-1) is fixedly disposed at the top of said electrical enclosure (209) and the other arc deflecting and ventilation assembly (200-2) is fixedly disposed to the bottom of said electrical enclosure (209). Having two arc deflecting and ventilation assemblies (200-1 and 200-2) improves the rate of ventilation thereby protecting the electrical enclosure (209) from extensive damage due to arcing.

Figure 10:
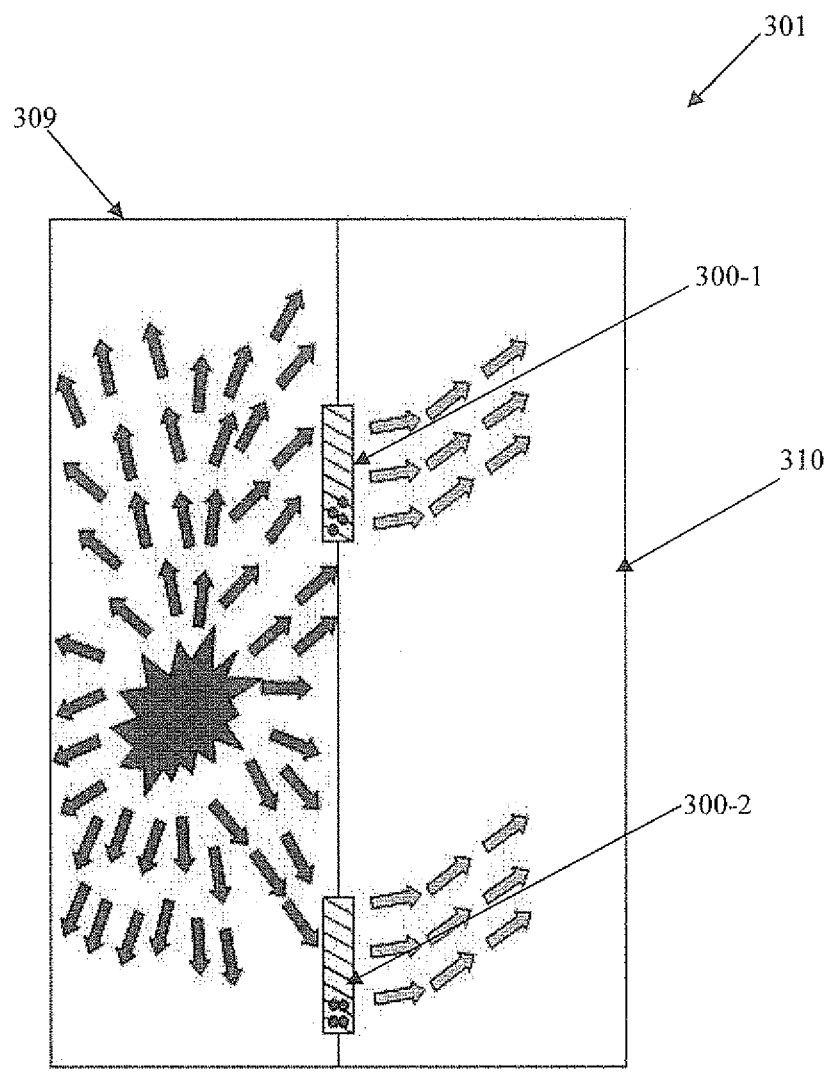
Figure 10:
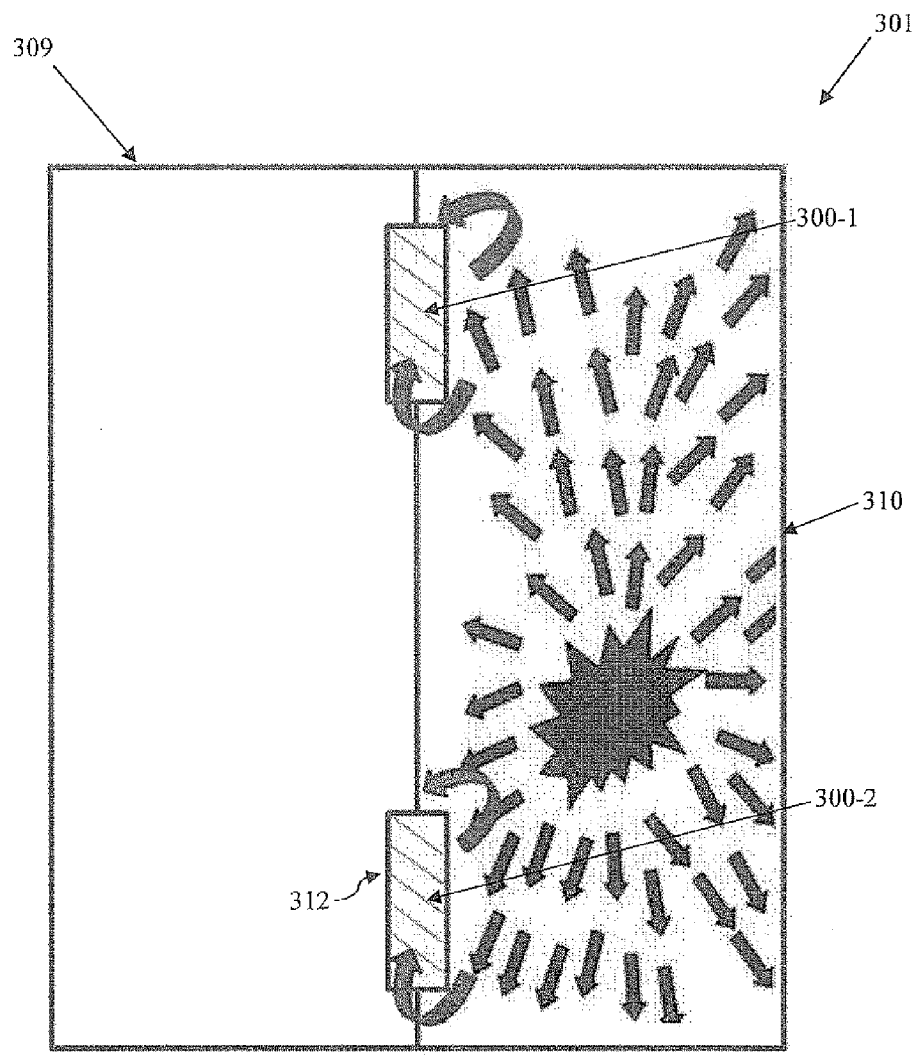

FIGS. 10 (a) and 10 (b) shows yet another embodiment of the invented system (301) for arc deflecting and ventilation. The system (301) comprises of two electrical enclosures (309 and 310) and two arc deflecting and ventilation assemblies (300-1 and 300-2). The arc deflecting and ventilation assemblies (300-1 and 300-2) are fixedly disposed at the junction of the two electrical enclosures (309 and 310). One of the two arc deflecting and ventilation assembly (300-1) is fixedly disposed at the top of the said electrical enclosures (309 and 310) and the other arc deflecting and ventilation assembly (300-2) is fixedly disposed to the bottom of the said electrical enclosures (309 and 310). The arc deflecting and ventilation assemblies (300-1 and 300-2) transfer the hot gases generated within the said electrical enclosure (309) to the other electrical enclosure (310). FIG. 10 (b), shows that the molten particles generated within the electrical enclosure (310) during an arc event needs to turn around to get into the slotted units (not shown in FIG. 10(b)) of the electrical assemblies (300-1, 300-2) but the molten particles generated during an arc event will be moving in a straight line. So the molten particles will be blocked by the closed face (312) of the slotted units. If the molten particles hit the side of the slotted units the wire mesh arrangements (not shown in FIG. 10(b)) of the electrical assemblies (300-1, 300-2) will block the hot particles from entering the slotted units of the electrical assemblies (300-1, 300-2).

FIG. 12 is a further embodiment of the invented system (401). Here the electrical enclosure (409) is provided with an arc deflecting and ventilation assembly (400) and a forced ventilation unit (422). The forced ventilation unit (422) may be in the form of a fan or a blower mechanism to increase air circulation within the electrical enclosure (409). The forced ventilation unit (422) enables additional intake of cool air and release of the hot gases generated within the electrical enclosure (409) via the arc deflecting and ventilation assembly (400).

As already mentioned the foregoing description is illustrative of the invention and not limitative to its scope; because it will be apparent to persons skilled in the art to devise other alternative embodiments without departing from the broad ambit of the disclosures made herein.

We claim:

1. An arc deflecting and ventilation assembly for electrical enclosure, housing at least an electrical equipment, said arc deflecting and ventilation assembly comprising:
   a slotted unit fixedly mounted to said electrical enclosure, said slotted unit having a closed face, an open face and a wall structure, said open face is placed adjacent to said electrical enclosure and said closed face is placed away from said electrical enclosure, upon said slotted unit being attached to said electrical enclosure, and said wall structure being provided with plurality of slots, in spaced apart manner, for venting hot gases generated within said electrical enclosure during an arcing event as well as during normal operation of said electrical equipment,
   an array of arc plates disposed on the open face of said slotted unit in spaced apart manner and configured to divert hot gases generated within the said electrical enclosure and
   mesh filter arrangement disposed along the inner periphery of said slotted unit and being configured to filter particles generated within said electrical enclosure during an arc event,
   wherein said closed face is configured to divert said hot gases generated within said electrical enclosure towards said wall structure,
   and wherein the walls of said slotted unit are provided with retaining means by means of which each of said arc plates is disposed on said slotted unit at predefined angle relative to a plane of said slotted unit.

2. The arc deflecting and ventilation assembly as claimed in claim 1, wherein said closed face is in the form of a plate attached to said wall structure.

3. The arc deflecting and ventilation assembly as claimed in claim 1, wherein said mesh filter arrangement is a wire mesh arrangement.

4. The arc deflecting and ventilation assembly as claimed in claim 3, wherein said wire mesh arrangement is permanently fastened to the said slotted unit.

5. The arc deflecting and ventilation assembly as claimed in claim 1, wherein said slots are provided along the walls of said slotted unit in a spaced apart manner.

6. The arc deflecting and ventilation assembly as claimed in claim 1, wherein said arc plates are made of sheet metal.

7. The arc deflecting and ventilation assembly as claimed in claim 6, wherein said arc plates are rectangular in shape.

8. The arc deflecting and ventilation assembly as claimed in claim 1, wherein each of said arc plates are arranged to subtend at an angle ranging from 30° to 75° relative to the plane of the open face of said slotted unit.

9. The arc deflecting and ventilation assembly as claimed in claim 1, wherein arc plates are disposed parallel to each other.

10. The arc deflecting and ventilation assembly as claimed in claim 1, wherein each of said arc plates is disposed equidistant from its adjacent arc plate(s).

11. The arc deflecting and ventilation assembly as claimed in claim 1, wherein said retaining means are formed by providing angular grooves on the edge of said wall structure.

12. The arc deflecting and ventilation assembly as claimed in claim 1, wherein said slotted unit is box shaped and said wall structure being formed of a pair of two mutually opposing panel members, wherein each of said panel members being configured to engage with its adjacent panel members on its either side and wherein each of said panel members being provided with flanges along its edges for retaining said wire mesh arrangements and wherein said slots are provided on said panel members.

13. The arc deflecting and ventilation assembly as claimed in claim 12, wherein said slots provided on said panel members are rectangular in shape.

14. The arc deflecting and ventilation assembly as claimed in claim 13, wherein each of said slots are equidistant from its adjoining slot(s).

15. The arc deflecting and ventilation assembly as claimed in claim 1, wherein said arc plates, upon being disposed on the open face of said slotted unit, span the length of the slots provided on said slotted unit.

16. The arc deflecting and ventilation assembly as claimed in claim 1, wherein said wire mesh arrangement is configured to filter particles of size 0.04".

17. The arc deflecting and ventilation assembly as claimed in claim 1, wherein percentage opening of the wire mesh arrangement is in the range of 50% to 70%.

18. A system for arc deflecting and ventilation of hot gases generated within an electrical enclosure, comprising:
 a electrical enclosure,
 at least an electrical equipment housed within said electrical enclosure, and
 at least an arc deflecting and ventilation assembly attached to said electrical enclosure,
 wherein said arc deflecting and ventilation assembly is as claimed in claim 1.

19. The system for arc deflecting and ventilation as claimed in claim 18, wherein said system is provided with a forced ventilation assembly to assist said arc deflecting and ventilation assembly in venting said hot gases generated within said electrical enclosure.

20. The system for arc deflecting and ventilation as claimed in claim 19, wherein said forced ventilation assembly comprises a fan configured to divert said hot gases generated within said electrical enclosure towards said arc deflecting and ventilation assembly.

21. A system for arc deflecting and ventilation of hot gases generated within electrical enclosures, comprising:
 an electrical enclosure,
 at least an electrical equipment housed within each of said electrical enclosure, and
 at least two arc deflecting and ventilation assemblies fixedly disposed on the electrical enclosure,
 wherein said arc deflecting and ventilation assembly is as claimed in claim 1.

22. A system for arc deflecting and ventilation of hot gases generated within electrical enclosures, comprising:
 two electrical enclosures,
 at least an electrical equipment housed within each of said electrical enclosure, and
 at least two arc deflecting and ventilation assemblies fixedly disposed between said electrical enclosures,
 wherein each of said arc deflecting and ventilation assembly is as claimed in claim 1.

* * * * *